United States Patent
Smith et al.

(10) Patent No.: US 10,567,466 B2
(45) Date of Patent: Feb. 18, 2020

(54) CO-STREAMING WITHIN A LIVE INTERACTIVE VIDEO GAME STREAMING SERVICE

(71) Applicant: Microsoft Technology Licensing, LLC, Redmond, WA (US)

(72) Inventors: Gregory M. Smith, Seattle, WA (US); Connor Peet, Redmond, WA (US); Nathan Yim, Seattle, WA (US); Joseph Michael Blouin, Bellevue, WA (US); Mehmet Akkurt, Seattle, WA (US); Chad Curtis Gibson, Seattle, WA (US); Matthew Stephen Salsamendi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/628,512

(22) Filed: Jun. 20, 2017

(65) Prior Publication Data

US 2018/0295175 A1      Oct. 11, 2018

Related U.S. Application Data

(60) Provisional application No. 62/482,537, filed on Apr. 6, 2017.

(51) Int. Cl.
| | | |
|---|---|---|
| *A63F 13/86* | (2014.01) | |
| *H04L 29/06* | (2006.01) | |
| *G06F 13/38* | (2006.01) | |
| *A63F 13/335* | (2014.01) | |
| *A63F 13/497* | (2014.01) | |

(Continued)

(52) U.S. Cl.
CPC .......... *H04L 65/608* (2013.01); *A63F 13/335* (2014.09); *A63F 13/497* (2014.09); *A63F 13/86* (2014.09); *G06F 13/38* (2013.01); *H04L 65/4069* (2013.01); *H04L 65/4092* (2013.01); *H04L 65/601* (2013.01); *H04L 69/04* (2013.01); *A63F 13/87* (2014.09); *A63F 2300/572* (2013.01); *H04L 29/0604* (2013.01); *H04N 5/268* (2013.01)

(58) Field of Classification Search
None
See application file for complete search history.

(56) References Cited

U.S. PATENT DOCUMENTS

| | | |
|---|---|---|
| 8,661,496 B2 | 2/2014 | Perlman et al. |
| 9,853,660 B1 | 12/2017 | Gopal et al. |
| 9,968,856 B1 | 5/2018 | Ninoles et al. |

(Continued)

OTHER PUBLICATIONS

Michaels, Chris, "Latency Matters in Online Gaming", https://www.wowza.com/blog/latency-matters-in-online-gaming, Published on: Mar. 7, 2017, 5 pages.

(Continued)

*Primary Examiner* — Damon J Pierce
(74) *Attorney, Agent, or Firm* — Ray Quinney & Nebeker P.C.; John O. Carpenter

(57) ABSTRACT

Technologies are described for enabling co-streaming of live video game streams by multiple broadcasters. For example, broadcasters that are eligible to co-stream can be determined. Invitations can be sent to the broadcasters to join a co-stream. After acceptance, a co-stream can be created. The co-stream can be streamed to viewer devices.

20 Claims, 9 Drawing Sheets

(51) Int. Cl.
*H04N 5/268* (2006.01)
*A63F 13/87* (2014.01)

(56) References Cited

U.S. PATENT DOCUMENTS

| | | | |
|---|---|---|---|
| 10,237,581 | B2 | 3/2019 | Henaire et al. |
| 2002/0152219 | A1 | 10/2002 | Singh |
| 2003/0038805 | A1 | 2/2003 | Wong et al. |
| 2003/0083049 | A1 | 5/2003 | Matthews |
| 2012/0115580 | A1 | 5/2012 | Hornik et al. |
| 2012/0331502 | A1* | 12/2012 | McIntire .......... H04N 21/25891 725/32 |
| 2014/0018165 | A1* | 1/2014 | Kern .................. A63F 13/355 463/31 |
| 2014/0274368 | A1* | 9/2014 | Cotter .................. A63F 13/355 463/31 |
| 2015/0121437 | A1 | 4/2015 | Tan |
| 2015/0201242 | A1 | 7/2015 | Belton |
| 2015/0298007 | A1* | 10/2015 | Agrawal .................. A63F 13/63 463/42 |
| 2015/0298010 | A1 | 10/2015 | Trombetta et al. |
| 2017/0003784 | A1 | 1/2017 | Garg et al. |
| 2017/0034237 | A1 | 2/2017 | Silver |
| 2017/0072322 | A1 | 3/2017 | Navok et al. |
| 2018/0004383 | A1 | 1/2018 | Iwami et al. |
| 2018/0225537 | A1 | 8/2018 | Cole et al. |
| 2018/0295069 | A1 | 10/2018 | Smith et al. |

OTHER PUBLICATIONS

Johnson, Eric, "Watch This (and Play Along): Interactive Streaming Puts the Power in Viewers' Hands", https://www.recode.net/2014/5/5/11626464/watch-this-and-play-along-interactive-streaming-puts-the-power-in, Published on: May 5, 2014, 3 pages.

Zhang, et al., "On Crowdsourced Interactive Live Streaming: A Twitch.TV-Based Measurement Study", in Proceedings of 25th ACM Workshop on Network and Operating Systems Support for Digital Audio and Video, Mar. 20, 2015, 7 pages.

"Genvid Releases Revolutionary Interactive Streaming Technology for eSports Broadcasts", http://www.fox34.com/story/34290347/genvid-releases-revolutionary-interactive-streaming-technology-for-esports-broadcasts, Jan. 18, 2017, 2 pages.

Twitch Fan, "Twitch MultiStreaming," <https://twitchfan.wordpress.com/2014/11/03/twitch-multistreaming/>, 3 pages (Nov. 3, 2014).

Twitch, "About Twitch," <https://www.twitch.tv/p/about>, 3 pages (accessed Jun. 5, 2017).

YouTube, "Get started with YouTube Gaming," <https://support.google.com/youtubegaming/answer/6213241?hl=en&ref_topic=6213253> 2 pages (accessed Jun. 5, 2017).

Blizzard, "Blizzard Streaming," <https://us.battle.net/support/en/article/7783> 11 pages (accessed Jun. 5, 2017).

StreamMe, "The Rough and Dirty Guide to Getting Started on StreamMe!," <https://www.stream.me/pages/getting-started> 5 pages (accessed Jun. 5, 2017).

PR Newswire, "Genvid Releases Revolutionary Interactive Streaming Technology for eSports Broadcasts," <http://www.prnewswire.com/news-releases/genvid-releases-revolutionary-interactive-streaming-technology-for-esports-broadcasts-300391171.html> 4 pages (Jan. 18, 2017).

Hooten, Eli, "The Gaming Live Streaming Ecosystem: A Primer", Retrieved from https://blog.gamewisp.com/the-gaming-live-streaming-ecosystem-a-primer-84b296ada7cb, Nov. 6, 2015, 18 Pages.

"Choice Chamber—Gameplay Walkthrough Part 1—Live on Twitch with Facecam! (PC)", Retrieved From: https://www.youtube.com/watch?v=khXvnr7yDrk, Retrieved Date: Jun. 22, 2014, 5 Pages.

"How To: Interactive Minecraft Stream on Beam.pro", Retrieved From: https://www.youtube.com/watch?v=2_9HPs5dJ7w, Retrieved Date: Jan. 18, 2016, 1 Page.

"Non Final Office Action Issued in U.S. Appl. No. 15/628,327", dated Nov. 30, 2018, 7 Pages.

"Non Final Office Action Issued in U.S. Appl. No. 15/655,558", dated Nov. 16, 2018, 11 Pages.

* cited by examiner

CO-STREAMING WITHIN A LIVE INTERACTIVE VIDEO GAME STREAMING SERVICE

CROSS REFERENCE TO RELATED APPLICATIONS

This application claims the benefit of U.S. Provisional Application No. 62/482,537, filed Apr. 6, 2017, which is hereby incorporated by reference.

BACKGROUND

Video game streaming services provide live video game streaming to viewers via the Internet. With some game streaming services, the viewers can view the gameplay of one of the users playing a video game, and can switch to watch different users playing the video game. However, the ability to stream or watch the gameplay of more than one video game player at a time is limited. For example, some services allow the viewer to watch multiple separate game streams on the same computer display. However, such solutions do not provide an integrated experience and do not allow the broadcasters and the game streaming service to manage multiple game streams.

Therefore, there exists ample opportunity for improvement in technologies related to video game streaming services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for enabling co-streaming within a live video game streaming service. For example, broadcasters that are eligible to co-stream can be automatically determined. Invitations to the broadcasters can be automatically sent. After acceptance, a co-stream can be created. The co-stream can be streamed to viewer devices for display to viewers of the co-stream.

As another example, a request can be received from a first broadcaster to invite a second broadcaster to join a co-stream. In response to the request, an invitation can be sent to the second broadcaster to join the co-stream. After acceptance, a co-stream can be created. The co-stream can be streamed to viewer devices.

As another example, users that are eligible to co-stream can be automatically determined. Invitations to the users can be automatically sent. After acceptance, a co-stream can be created. The co-stream can be streamed to viewer devices.

As described herein, a variety of other features and elements can be incorporated into the technologies separately and/or in combination.

DETAILED DESCRIPTION

Overview

Figure 1:
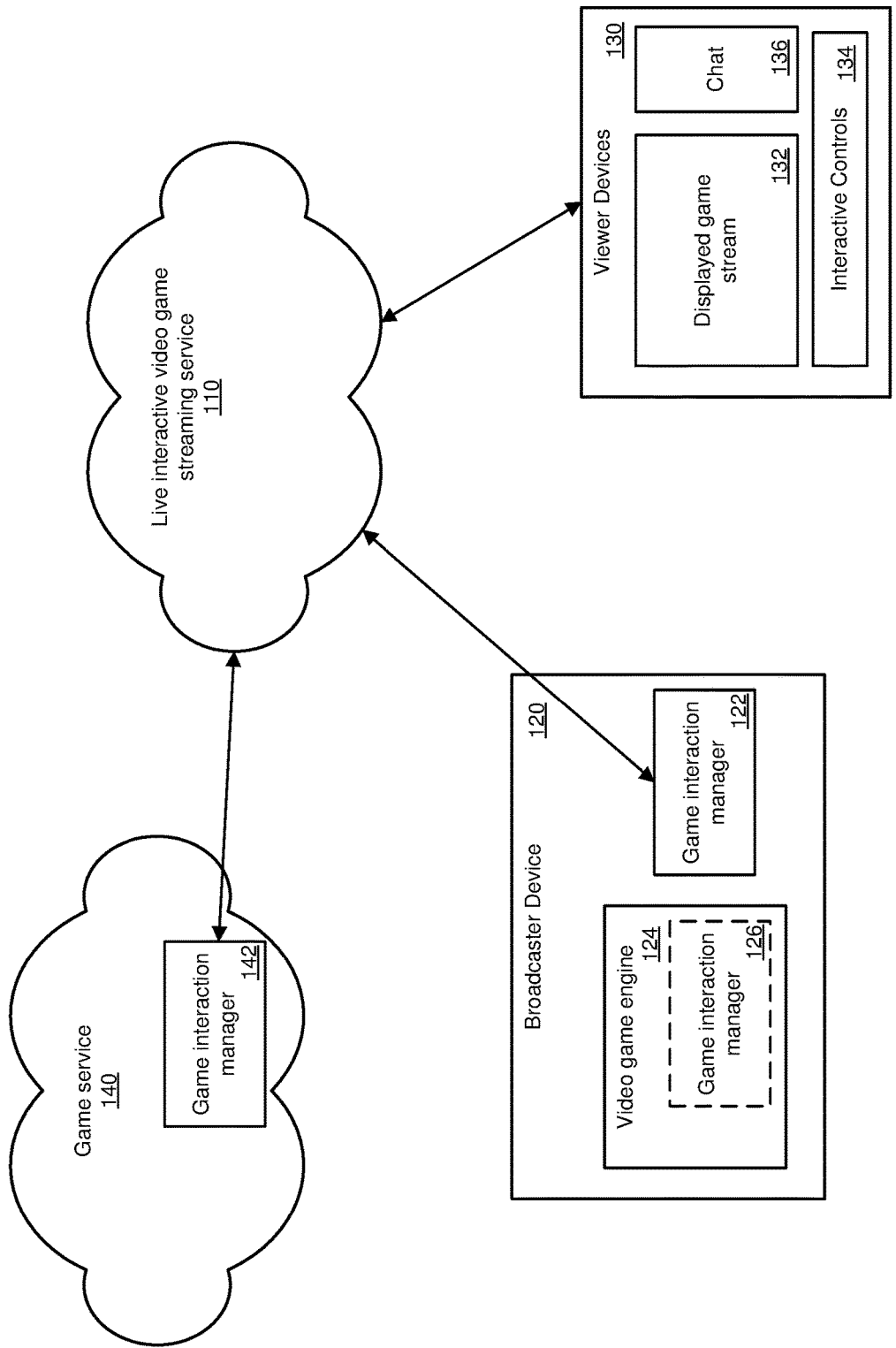
FIG. 1 is diagram depicting an example live video game streaming environment.

As described herein, various technologies are described for enabling interactivity with video games by viewers of a live video game streaming service. The live video game streaming service is a service in which a broadcaster plays a video game (e.g., on the broadcasters computing device) which is then streamed live to a number of viewers (e.g., tens, hundreds, thousands, or more). The live video game can be streamed by a streaming service (e.g., a cloud-based streaming service operating as a web site). The viewers of the live video game stream can interact with the video game, and control aspects of gameplay, in a variety of ways. For example, the viewers can drop items in the game (e.g., weapons, armor, power-ups, etc.), control choices (e.g., tell the broadcaster which direction to go, or which action to take, in the game), take control of the broadcaster's avatar and/or other game characters, etc. One example of a live video game streaming service is the Mixer interactive livestreaming service provided by Microsoft® (previously the Beam service).

In order to support the live interactivity, the live video game streaming service operates with very low latency (e.g., sub-second latency, such as much lower than one second). Operating with very low latency allows the viewers to interact in real-time with the video game as the broadcaster is playing, and have their interactions occur in synchronization with the gameplay. For example, if the broadcaster is playing a game in which their avatar has a choice of taking paths to the left or the right, then a viewer could activate a command to direct the broadcaster to take one of the paths in real-time. Operating with very low latency makes the interaction effective and enhances the interaction experience of the viewers (e.g., with higher latency if the broadcaster had already taken one of the paths then the viewer's interaction would not work). Sub-second latency allows the broadcaster to communicate in real-time, and the viewers to respond in real-time. Operating with Sub-second latency also provides very close synchronization (e.g., less than one-second difference) between multiple broadcaster streams in a co-streaming situation. For example, if two broadcasters are co-streaming the same video game in the same multiplayer session, viewers will observe the two broadcaster's streams as very closely synchronized which will result in a more seamless experience (e.g., instead of having broadcaster streams that are not closely synchronized, such as with greater than one second difference, which can result in a confusing experience for the viewers).

Various types of interactivity can be provided within the live video game streaming service environment. For example, the viewers can be provided with interactive controls (e.g., buttons, joysticks, gamepad controls, or other interactive controls) that can be activated to affect the video game, such as spawning enemies in the video game, dropping power-ups, creating in-game items (e.g., weapons, armor, etc.), increasing player health, taking control of the broadcaster's player in the game, and taking control of another character in the game. Examples of interactive controls include buttons that the viewers can press and joysticks or directional controls that the user can move in various directions.

Live Video Game Streaming Environment

In the technologies described herein, an environment can be provided to support live video game streaming. For example, various computing devices and computing services can provide a live interactive video game streaming service web site that communicates with broadcasters to receive interactive video game streams and communicates with viewers to provide the interactive video game streams.

FIG. 1 is a diagram 100 depicting an example live video game streaming environment. In the diagram 100, a live interactive video game streaming service 110 provides live interactive video game streaming allowing viewers using viewer devices 130 to view and interact with video games being played by broadcasters using broadcaster devices 120. The live interactive video game streaming service 110 can include various types of computer hardware and software (e.g., servers, web hosting software, streaming software, web server software, cloud computing resources, etc.). In some implementations, the live interactive video game streaming service 110 operates as a web site where the viewers can browse various live video game streams, view a selected live video game stream, and interact in real-time with the video game being played.

In the diagram 100, a broadcaster device 120 is used by a broadcaster to live stream a video game. The broadcaster device 120 can be a desktop computer, laptop computer, or another type of computing device.

Using the broadcaster device 120, the broadcaster plays the video game and streams it live to the viewer devices 130 via the live interactive video game streaming service 110. In some implementations, the video game is running locally on the broadcaster device 120, as indicated by the video game engine 124. In some implementations, running the video game involves communication by the broadcaster device 120 with an external or remote video game service 140 (e.g., when playing an online and/or multiplayer video game). In some implementations, the video game is running on a computing device (not depicted) that is separate from the broadcaster device 120, such as a gaming console. For example, the broadcaster device 120 can obtain the game stream from the separate computing device (e.g., from the gaming console) via a network or a video capture device.

A game interaction manager (e.g., game interaction manager 122, 126, and/or 142) manages interaction with the video game. For example, the game interaction manager can maintain the control state of the various interactive controls (e.g., received as control events from the viewer devices 130 via the live interactive video game streaming service 110), communicate using a protocol that communicates control events and that supports switching communication modes, and/or supports co-streaming among a number of broadcasters. The game interaction manager 122 can run on the broadcaster device 120 (e.g., as part of a software component or software development kit that is associated with the live interactive video game streaming service 110). The game interaction manager 126 can also run as a part of the video game engine 124. The game interaction manager 142 can also run as part of the game service 140. In some implementations, only one or more instances of the game interaction manager are present (e.g., just game interaction manager 122). In some implementations, the interaction manager is called the Mixer manager.

Co-Streaming

In the technologies described herein, separate live interactive video game streams can be provided for display to viewers. For example, multiple broadcasters (e.g., multiple broadcaster devices, one of which could be broadcaster device 120) can be separately broadcasting live interactive video game streams. The video game streams from the multiple broadcasters can be provided (e.g., delivered individually or combined at the live interactive video game streaming service 110) for display to viewers (e.g., to viewer devices 130). The video game streams provided by the broadcasters may or may not be interactive. For example, a co-stream can be created in which some or all of the broadcaster video game streams are not interactive (e.g., the broadcasters can be streaming their gameplay with no interactivity exposed to viewers).

For example, two broadcasters may be live streaming their video games in the same multiplayer session of a multiplayer game (e.g., an online multiplayer game such as Halo). One of the broadcasters can invite the other broadcaster to co-stream. Upon accepting, both broadcast streams can be provided to viewers (e.g., shown side-by-side or in another arrangement) by the video game streaming service. For example, the live interactive video game streaming service 110 can create a co-stream comprising individual broadcaster streams that are transmitted and displayed side-by-side in the displayed game stream 132 windows of the viewer devices 130. In some implementations, all of the viewers that were watching either of the two broadcasters (e.g., that were subscribed to either of the two broadcasters' channels) will automatically receive the co-stream.

In some implementations, social features will also be combined when a co-stream is created. For example, the chat areas (e.g., chat area 136) associated with two broadcasters' streams can be combined when the two broadcasters are co-streaming.

While the technologies for co-streaming are described in the context of a live interactive video game streaming service, co-streaming can be performed within other types of video streaming services that are not broadcasting video game content. For example, the live interactive video game streaming service 110 can be another type of video streaming service, such as a video streaming service providing creative content (e.g., making music, web shows, programming, painting, etc.).

Co-Streaming with Explicit Invitations

In some implementations, co-streaming is performed using explicit invitations. For example, one broadcaster can explicitly invite one or more other broadcasters (and the one or more other broadcaster can accept or decline). If accepted, the video game streams from the broadcaster sending the invitation as well as the one or more other broadcasters accepting the invitation can be streamed to the viewers for display as a co-stream. The co-stream can provide multiple broadcaster video game streams to the viewers as independent streams and/or as a combined stream (e.g., a combined stream that is created as a single composited stream).

Figure 2:
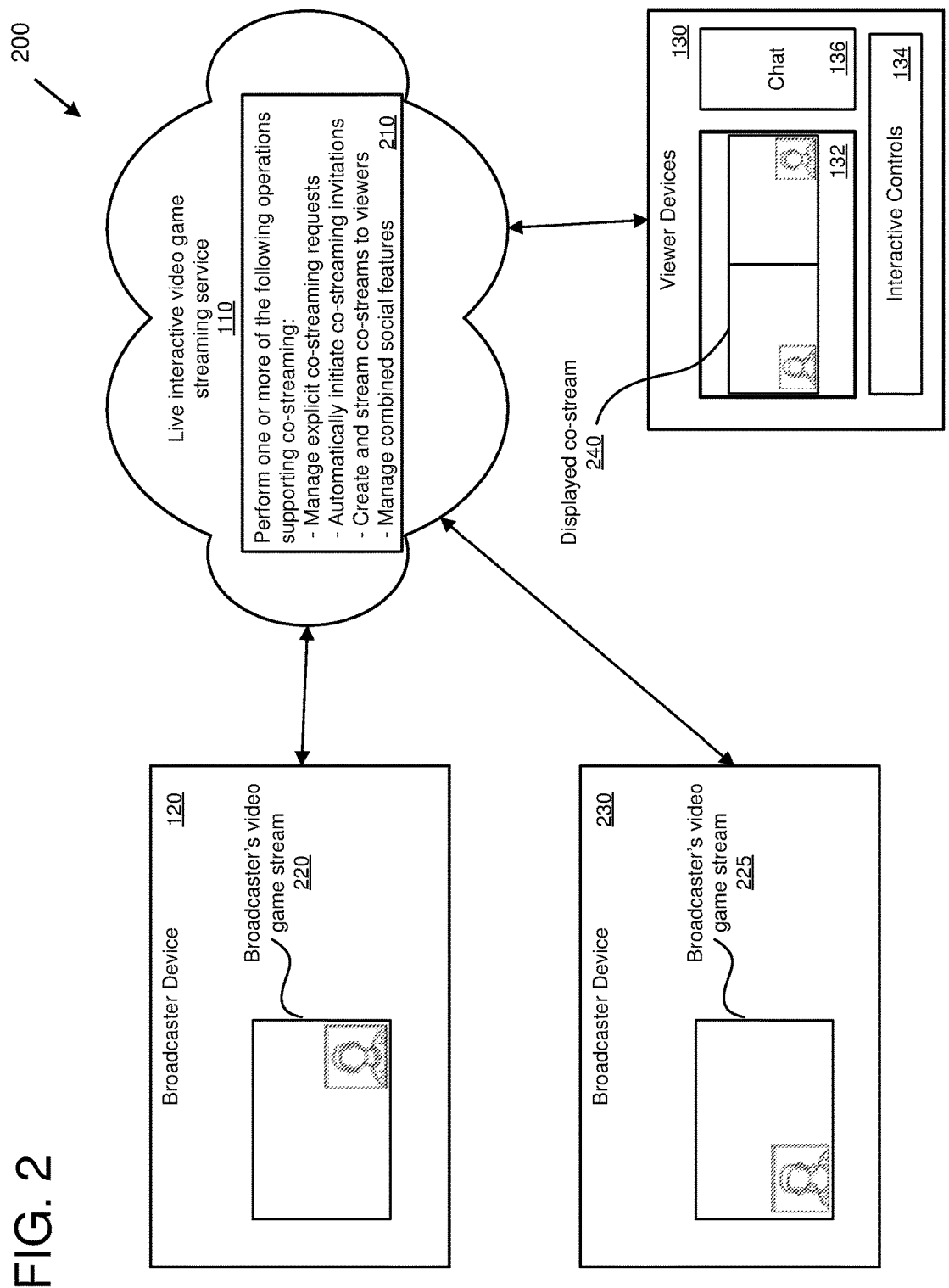
FIG. 2 is diagram depicting an example live video game streaming environment supporting co-streaming by broadcasters.

FIG. 2 is diagram 200 depicting an example live video game streaming environment supporting co-streaming by broadcasters. In the diagram 200, broadcaster device 120 and broadcaster device 230 are streaming a live interactive video game stream. Specifically, broadcaster device 120 is streaming the video game stream indicated at 220, and broadcaster device 230 is streaming the video game stream indicated at 225. The individual broadcaster's video game streams 220 and 225 can be co-streamed to the viewer devices 130. In this example, both the video game stream 220 and the video game stream 225 are displayed at the viewer devices 130 as a displayed co-stream 240, which displays both streams side-by-side (although other display arrangements are supported). While the diagram 200 depicts two broadcasters, the co-streaming technology can support any number of broadcasters. For example, three, four, or more broadcasters' live interactive video game streams can be co-streamed to viewers (e.g., as independent and/or combined streams).

In some implementations, the co-stream is initiated using an explicit invitation (also called a manual invitation). For example, the broadcaster using broadcaster device 120 can invite the broadcaster using broadcaster device 230 to join in a co-stream. The explicit invitation can be initiated using a graphical user interface control (e.g., a menu that allows the broadcaster using broadcaster device 120 to select the broadcaster using broadcaster device 230) or using another type of control (e.g., sending an instant message or email). The recipient of the explicit invitation (in this example, the broadcaster using broadcaster device 230) can be notified of the invitation to co-stream (e.g., as a pop-up or alert message presented on the broadcaster's display). The recipient can accept or deny the invitation to co-stream (e.g., select a graphical control to accept, or decline, the invitation).

The live interactive video game streaming service 110 performs operations supporting co-streaming, as depicted at 210. For example, the live interactive video game streaming service 110 can receive a request from broadcaster device 120 to invite the broadcaster using broadcaster device 230 to co-stream. If the live interactive video game streaming service 110 receives an acceptance from the broadcaster device 230, the live interactive video game streaming service 110 can create a co-stream and send it to the viewer devices 130.

An explicit invitation can be sent to and/or from a user that is currently playing and streaming a game, a user that is currently playing a game but not streaming, and/or a user that is not playing a game. For example, a user that is currently playing and broadcasting a game can invite their friend (who is not currently playing) to start playing the game and join in co-streaming the game.

Co-Streaming with Automatic Invitations

In some implementations, invitations to join a co-stream are automatically provided (also called an implicit invitation). For example, the live interactive video game streaming service can send an invite to one or more broadcasters to create a co-stream. For example, the live interactive video game streaming service can automatically determine that two or more broadcasters are currently streaming in the same multiplayer session of the same multiplayer game and send out an invite to the broadcasters to co-stream.

The co-streaming depicted in the diagram 200 of FIG. 2 can also be initiated using an automatic invitation. As depicted at 210, the live interactive video game streaming service 110 can perform operations to automatically initiate co-streaming invitations. For example, the live interactive video game streaming service 110 can determine that broadcaster devices 120 and 230 are both streaming in the same multi-player game. In response, the live interactive video game streaming service 110 can automatically send invitations to the broadcasters using broadcaster devices 120 and 230 to join a co-stream. The invitations can take the form of a pop-up or alert message presented on the broadcasters' displays. If the broadcasters accept, the live interactive video game streaming service 110 can create a co-stream and send it to the viewer devices 130.

The live interactive video game streaming service 110 can automatically determine to invite one or more broadcasters to join in a co-stream based on a variety of different criteria, which can be applied separately or in combination. One example criteria is the video game that the broadcasters are playing. For example, if multiple broadcasters are playing the same multiplayer video game in the same multiplayer session, then the live interactive video game streaming service 110 can automatically determine that the multiple broadcasters should be invited to co-stream.

Another example criteria is whether the broadcasters are in a party together. For example, if multiple broadcasters are playing a video game and are in the same party, then the live interactive video game streaming service 110 can automatically determine that the multiple broadcasters should be invited to co-stream. The broadcasters that are in the same party together may be playing the same game or different games. In addition, a user in a party that is not playing a game may still be invited to co-stream. For example, a user may provide commentary and therefore join the co-stream as a commentary broadcaster (e.g., with audio and video, or just audio).

Another example criteria is whether the broadcasters are performing a similar activity. For example, if two broadcasters are demonstrating a speed run of the same game, then the two broadcasters can be automatically invited by the live interactive video game streaming service 110 to co-stream their speed runs. The broadcasters can be playing different games or the same game (e.g., performing speed runs for the same single-player game).

Another example criteria is whether the broadcasters are playing in a tournament together. For example, multiple broadcasters that are playing in the same tournament can be invited to co-stream. For example a specific broadcaster from each team in the tournament can be selected to co-stream (e.g., the top player from each team).

Another example criteria are the social links between users. For example, broadcasters that are friends within a social network can be invited to join a co-stream.

An automatic invitation can be sent to a user that is currently playing a game and currently steaming the game. For example, automatic invitations can be sent to multiple users that are currently broadcasting in the same multiplayer game session. The users can receive a message asking them to join a co-stream.

An automatic invitation can be sent to a user that is currently playing a game but not currently streaming the game. For example, an automatic invitation can be sent to a user that is currently playing (but not streaming) in a multiplayer game session with another user that is currently broadcasting in the same multiplayer game session. The user that is currently playing can receive a request to start streaming and join the co-stream. The user that is currently broadcasting can receive a request to join the co-stream.

An automatic invitation can be sent to a user that is not currently playing a game. For example, the user may be in a party with another user that is currently playing and/or broadcasting in a game. The user that is not currently playing can receive an invitation to start playing and broadcasting the game, and join a co-stream with the other user.

In general, any of the users that are being invited to join the co-stream can be playing a game and streaming, playing a game but not streaming, or not playing a game.

Acceptance of Co-Streaming Invitations

In some implementations, a user is notified of a co-streaming invitation (an explicit or automatic invitation) and has the option to accept or decline. For example, a message or alert can be presented to the user while the user is playing and/or broadcasting a video game asking if the user wants to join a co-stream. Additional information can also be displayed in association with the invitation (e.g., the identity of the other broadcaster(s) in the co-stream, the identity of the user sending the invitation if it is an explicit invitation, an indication that the invitation was automatically generated, the video game being played, etc.). The user receiving the invitation then has the option to accept the invitation (e.g., select an accept button) or decline (e.g., select a decline button).

In some implementations, acceptance of co-streaming invitation can also be controlled by as user-configurable setting (a setting or other type of preference that the user can set to control co-streaming acceptance). For example, a user can configure a setting to automatically accept co-streaming invitations from the user's friends or party members (e.g., and automatically decline co-streaming invitations from users that are not friends or party members). In this situation, if the user receives an invitation from the user's friend, then the user can be automatically joined in the co-stream without the user having to accept (however, the user can be presented with a message indicating that the user has been automatically joined in the co-stream). Acceptance of co-streaming invitations can also be controlled by an opt-in user-configurable setting. For example, users that are playing in a tournament can opt-in to allow co-streaming during the tournament without the users having to take any affirmative action to accept co-streaming invitations during the tournament. Acceptance based on user-configurable settings can be used for acceptance of an explicit invitation and/or an automatic invitation.

Virtual Cameras

In some implementations, co-streams can include virtual cameras. A virtual camera presents a stream (comprising video and/or audio) of the video game from a perspective other than a broadcaster (i.e., other than a user streaming the video game that the user is playing). A virtual camera can be created automatically (e.g., upon detecting an in-game event, such as a boss spawn) and automatically joined to a co-stream (e.g., by the live interactive video game streaming service 110).

A virtual camera can be used to present video and/or audio of an in-game event. For example, if a number of broadcasters are co-streaming in the same multiplayer session and an in-game event occurs (e.g., a boss creature spawns), then a virtual camera can be created and joined as a separate stream of the co-stream to depict the gameplay from the point of view of the in-game event (e.g., from the point of view of the boss creature).

Combined Social Features

In some implementations, social features are combined when multiple broadcasters are co-streaming One social feature that can be combined is the chat area (also called a chat panel). Without co-streaming, a chat area displays viewer chat information for the viewers that are viewing a particular broadcaster's live video game stream. When co-streaming begins, the viewers of each individual broadcaster are associated with the co-stream. As a result of the association with the co-stream, all viewers of the co-stream will see a combined chat area (also called a unified chat panel) that displays chat information from all of the viewers of the co-stream (all the viewers that were previously watching the separate broadcaster streams before the co-stream began). For example, the chat area 136 can represent a combined chat area displaying chat information from viewers of the displayed co-stream 240.

The combined chat area can display chat information from the viewers in a seamless manner. For example, the chats from the viewers can be displayed in order based on the time the chats are submitted without separating them based on the original broadcaster a given viewer was associated with (e.g., based on the original broadcaster's channel the given user was watching).

Providing a combined chat experience can be performed automatically and seamlessly from the point of view of the viewers. For example, a specific viewer could be viewing the live interactive video game stream 220 from broadcaster device 120 (before co-streaming has started). Once the co-streaming has begun, the specific viewer can automatically receive the displayed co-stream 240, and the chat area 136 can automatically start displaying chat information from all of the viewers of the co-stream (in this example, the viewers previously viewing video game stream 220 as well as the viewers previously viewing video game stream 225).

Another social feature that can be combined is a poll. For example, the viewers of all of the broadcasters joined in the co-stream can participate in combined polls. Another combined social feature is an overall viewer count that combines the viewer counts from all broadcaster streams that are included in the co-stream. The overall viewer count can be displayed to the viewers (e.g., associated with the chat area 136).

Another social feature that can be combined is moderation. A given broadcaster can have one or more moderators that are associated with the broadcaster's video game stream. The moderators perform moderation actions for their associated stream (e.g., banning, timeouts, removing or editing chat posts, answering questions, etc.). When a co-stream is created, the moderators associated with the broadcasters of the co-stream can perform moderation actions across all of the viewers of the co-stream. For example, a moderator associated with a first broadcaster can ban a viewer that is associated with a second broadcaster. However, in some implementations, a moderator associated with a specific broadcaster cannot permanently affect the viewers associated with a different broadcaster. For example, the moderation actions performed by a moderator associated with a first broadcaster on a viewer associated with a different broadcaster may only last while the co-stream is active (e.g., if the moderator bans a viewer associated with a different broadcaster, then the viewer will only be banned while the co-stream is active, and would not be banned from the different broadcaster's stream after the co-stream ends).

The viewers of a co-stream can remain associated with their initial broadcaster's stream (e.g., associated with the initial broadcaster's channel). For example, a particular viewer can be viewing the video game stream 220 before the co-stream is created. Once the co-stream is created, the particular viewer would see the displayed co-stream 240 comprising both broadcaster's video game streams 220 and 225. Once the co-stream ends, the particular viewer would return to just viewing the video game stream 220 (to the original broadcaster that the viewer was viewing before the co-stream began).

Combined Interactive Controls

In some implementations, interactive controls are combined when multiple broadcasters are co-streaming. For example, some or all of the interactive controls (e.g., interactive controls 134) can be combined interactive controls during co-streaming Combined interactive controls affect multiple broadcasters. An example of a combined interactive control is an interactive control that sets the spawn point for multiple broadcasters in a video game. Another example of a combined interactive control is an interactive control that drops an in-game item (e.g., a power-up) for multiple broadcasters.

Using combined interactive controls unifies interactivity of the viewers of the co-stream. For example, instead of each broadcaster's users having separate interactive controls, combined interactive controls allow all viewers to affect gameplay across the broadcasters of the co-stream.

Viewer Selection of Broadcasters

In some implementations, viewers can select the broadcasters that they want to view. For example, a particular viewer can be presented with a list of broadcasters and the viewer can select one or more of them to view in a co-stream.

In some implementations, viewers of a video game event can select which of the broadcasters they want to view. For example, a video game event could be a five versus five tournament. Each viewer of the match can independently select one or more of the ten broadcasters to view in a co-stream. For example, a specific viewer could select two specific broadcasters on the first team and two specific broadcasters on the second team to view in a co-stream. In some implementations, the total number of broadcasters supported in a co-stream is limited (e.g., due to computing resource or bandwidth limitations), such as to a maximum of four broadcasters.

Live Interactive Video Game Streams

In order to provide a co-stream experience for the viewers, a live interactive video game stream from the broadcasters is delivered to the client devices. For example, the live interactive video game streaming service can receive the individual broadcasters' streams and transmit them (e.g., as independent streams and/or as combined streams) to the viewer devices.

In some implementations, the co-stream comprises independent video game streams from each of the broadcasters of the co-stream. Including independent video game streams provides a number of advantages and supports additional functionality. One advantage and feature is that the independent video game streams can be saved and accessed later (e.g., each broadcaster's stream can be saved as a separate video file with an association to the co-stream of which it was a part). For example, a viewer could view a co-stream at a later time with full control over what the viewer wants to see. For example, the viewer could select which broadcaster's stream to view (e.g., just one broadcaster's stream, or in general any one or more of the available broadcaster streams in the co-stream). The viewer could re-view the co-stream from a different perspective (e.g., view a different broadcaster's stream), or switch between broadcasters while viewing the co-stream.

Another advantage and feature is that the independent video game streams can be edited independently. For example, a user could access a previously saved co-stream and create an edited version. The edited version could use clips from one or more of the independent broadcaster streams of the co-stream. For example, the user could create a highlights video using segments from one or more of the individual streams of the co-stream.

Another advantage and feature is that the service and/or viewers can dynamically change the bitrate of the streams on a viewer-by-viewer basis. For example, if a particular viewer device has limited bandwidth, then the live interactive video game streaming service can independently adjust the bitrates of the broadcaster streams (e.g., lower the bitrate of all streams or just specific streams). The bitrate adjustment can also be controlled by which streams a particular viewer is currently viewing. For example, if a particular viewer is currently viewing three out of four broadcaster streams of a co-stream, then the three currently viewed streams can be sent at a higher bitrate than the fourth stream.

Another advantage and feature is that the viewers can individually select which broadcasters to view in the co-stream and switch between them. For example, if a viewer is watching a 16 versus 16 video game tournament, the viewer could select four of the 32 players to watch in a co-stream. The viewer could switch to watch different broadcasters at any time.

Another advantage and feature is that computing resource savings can be realized using independent video game streams. For example, the live interactive video game streaming service only needs to perform minimal processing to deliver the independent streams (e.g., no decoding, compositing, or re-encoding is needed), which can save computer processor and memory resources over solutions that process the streams (e.g., creating a composited video game stream). In addition, different viewers can be provided co-streams with different broadcasters, different bitrates, etc., with minimal additional load being placed on the live interactive video game streaming service.

Figure 3:
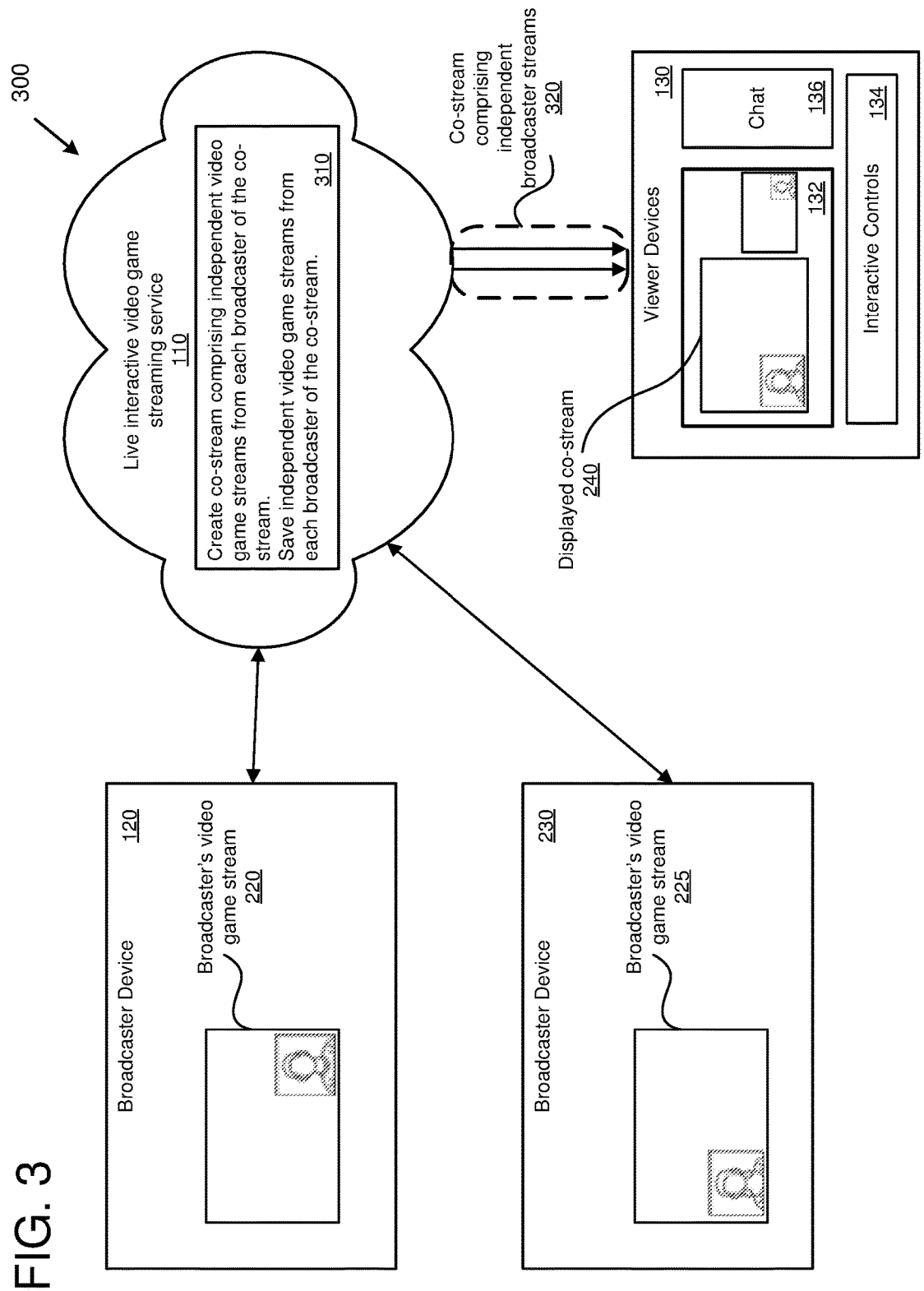
FIG. 3 is diagram depicting an example live video game streaming environment supporting co-streaming with independent broadcaster streams.

FIG. 3 is diagram 300 depicting an example live video game streaming environment supporting co-streaming with independent broadcaster streams. As depicted in the diagram 300, the live interactive video game streaming service 110 receives broadcaster video game streams 220 and 225. The live interactive video game streaming service 110 creates a co-stream comprising independent video game streams from each broadcaster of the co-stream, as depicted at 310. The live interactive video game streaming service 110 also saves the independent video game streams from each broadcaster of the co-stream (e.g., as separate video files), as depicted at 310. The live interactive video game streaming service 110 transmits the co-stream to the viewer devices 130, as depicted at 320. Because the co-stream contains independently accessible broadcaster streams, the viewer devices 130 can control how the streams are displayed. In this example, in the displayed co-stream 240, one of the broadcaster streams has been resized by a viewer to display at a larger size than the other broadcaster stream. For example, the viewer devices 130 can receive the independent broadcaster steams in the co-stream (as depicted at 320), perform various types of processing (e.g., re-sizing, layout arrangement, compositing, etc.), and display the co-stream (e.g., as depicted at 240).

In some implementations, the co-stream is delivered to the viewers as a combined live interactive video game stream that is created as a single composited video stream. In order to create the single composited video stream, the individual broadcaster video game streams can be received, decoded, composited or otherwise combined into a single video, and re-encoded into a single composited video stream. The format or layout of the individual broadcaster video game streams is fixed when the single composited video stream is created (e.g., the size and/or arrangement of the broadcaster videos is set at the time the individual streams are composited or otherwise combined). For example, the layout could be two broadcasters displayed side-by-side, or four broadcasters displayed each in one-quarter of the display area. When using a single composited video stream, the live interactive video game streaming service can still save the independent broadcaster streams before they are composited or otherwise combined, which can support some of the independent stream features (e.g., allow viewers to view or edit independent streams at a later time).

Figure 4:
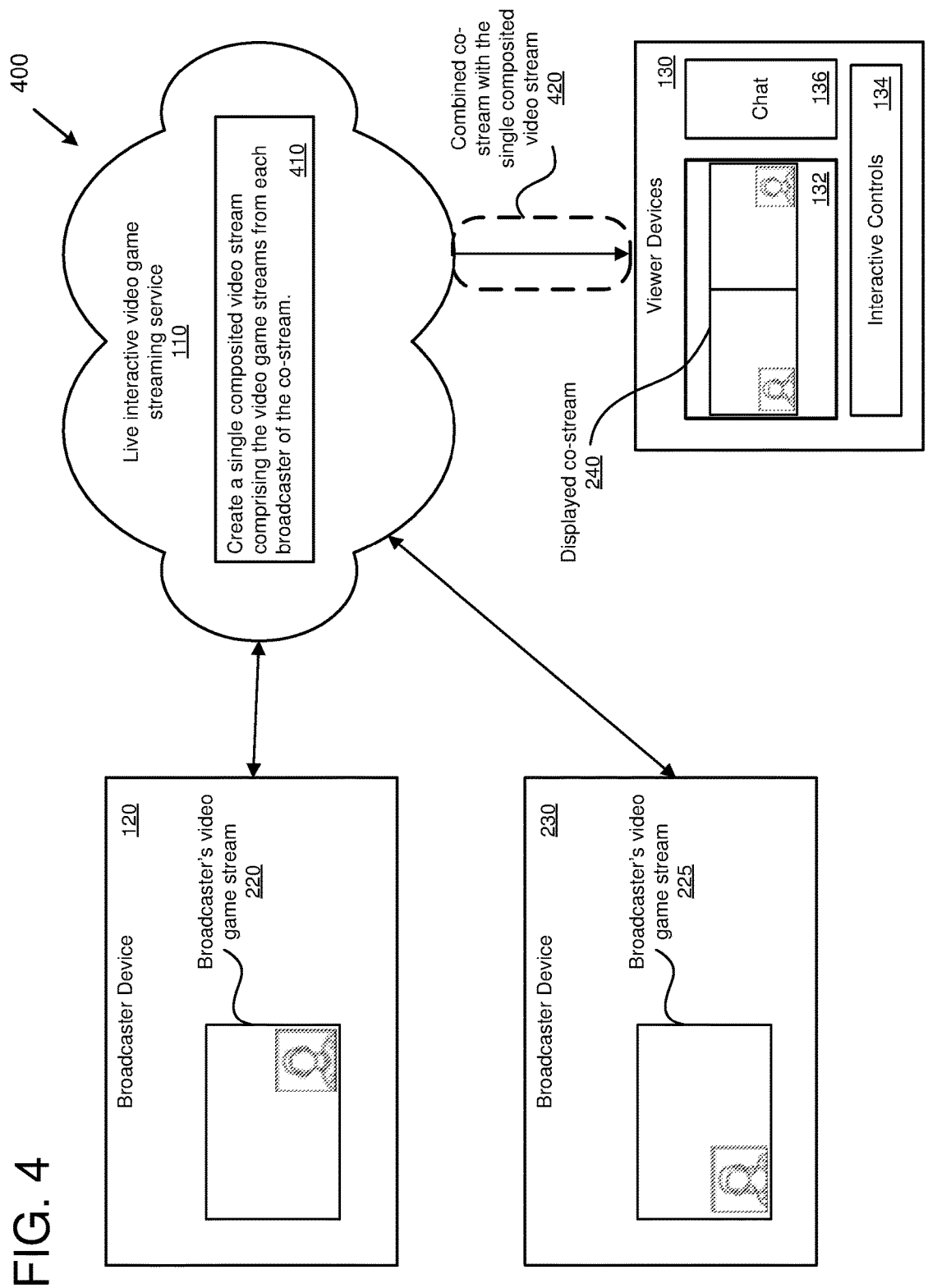
FIG. 4 is diagram depicting an example live video game streaming environment supporting co-streaming with a single composited video game stream.

FIG. 4 is diagram 400 depicting an example live video game streaming environment supporting co-streaming with a single composited video game stream. As depicted in the diagram 400, the live interactive video game streaming service 110 receives broadcaster video game streams 220 and 225. The live interactive video game streaming service 110 creates a single composited video game stream comprising the video game streams from each broadcaster of the co-stream, as depicted at 410. The live interactive video game streaming service 110 transmits the combined-co-stream with the single composited video stream to the viewer devices 130, as depicted at 420.

Co-Streaming Methods

In the technologies described herein, methods can be provided for co-streaming within a live interactive video game streaming service. For example, the live interactive video game streaming service can identify users (e.g., users that are not currently playing a video game, users that are currently playing a video game but not broadcasting, and/or users that are currently playing a video game and broadcasting to viewers) and invite them to co-stream. Invitations can be sent (e.g., explicitly by other users and/or automatically by the service) to users to co-stream. Upon acceptance, a co-stream can be created comprising the video game streams of the broadcasters joined in the co-stream. The co-stream can be streamed to viewer devices where the co-stream can be displayed to viewers using the viewer devices.

Figure 5:
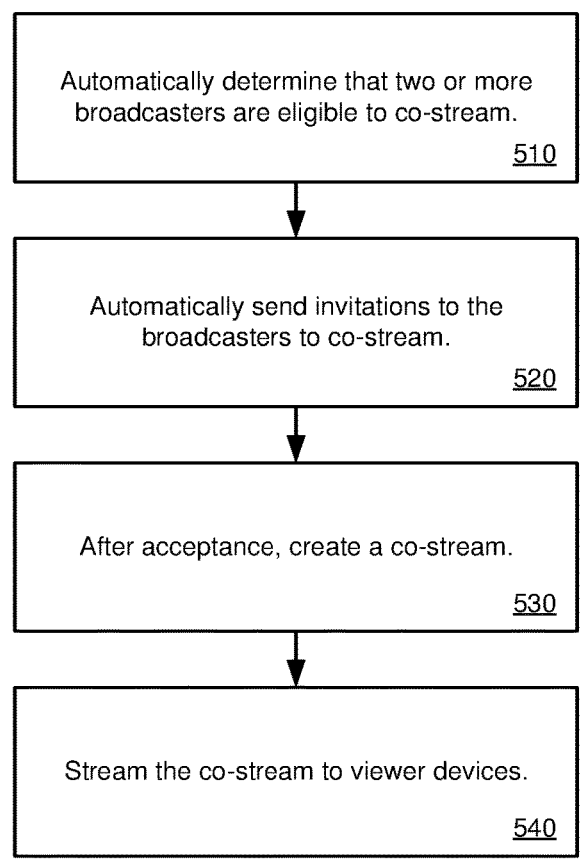
FIG. 5 is a flowchart of an example method for co-streaming within a live interactive video game streaming service.

FIG. 5 is a flowchart of an example method 500 for co-streaming within a live interactive video game streaming service. For example, the example method 500 can be performed by the live interactive video game streaming service 110.

At 510, an automatic determination is made that two or more broadcasters are eligible to co-stream. For example, the broadcasters can be playing the same video game in the same multi-player session.

At 520, invitations are automatically sent to the two or more broadcasters that were determined at 510. The invitations can be accepted or declined. For example, a broadcaster can receive a request (e.g., displayed as an alert or pop-up message on the broadcaster's computer display) and indicate whether the broadcaster accepts or declines the invitation. In some implementations, a user-configurable setting is used to automatically determine whether the broadcaster accepts or declines without the invitation being displayed to the broadcaster.

At 530, after acceptance by the two or more broadcasters (e.g., explicit acceptance or acceptance based on user-configurable settings), a co-stream is created. The co-stream can comprise independent broadcaster video game streams or a combined stream (e.g., a single composited video game stream).

At 540, the co-stream is streamed (e.g., via the Internet) to a plurality of viewer devices as a co-stream. The plurality of viewer devices provide the co-stream to viewers that are associated with the two or more broadcasters (e.g., viewers that were watching broadcast channels of the two or more broadcasters before the co-stream began).

Figure 6:
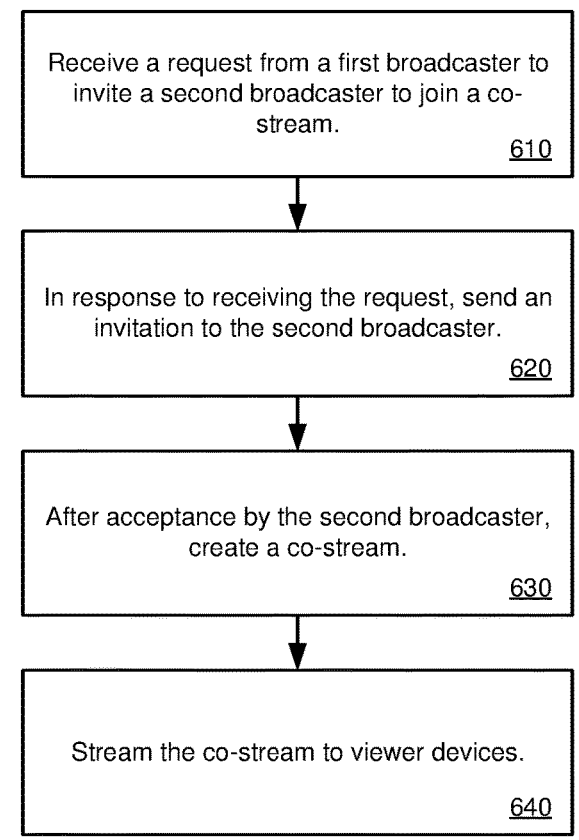
FIG. 6 is a flowchart of an example method for co-streaming within a live interactive video game streaming service using explicit invitations.

FIG. 6 is a flowchart of an example method 600 for co-streaming within a live interactive video game streaming service using explicit invitations. For example, the example method 600 can be performed by the live interactive video game streaming service 110.

At 610, a request is received from a first broadcaster to invite a second broadcaster to join a co-stream. In some implementations, the first broadcaster is currently steaming a video game. The second broadcaster may or may not be currently streaming. In some implementations, the first broadcaster is playing a video game (but not broadcasting). In some implementations, the first broadcaster is not playing a video game.

At 620, in response to receiving the request, an invitation is sent to the second broadcaster to join the co-stream with the first broadcaster. For example, the invitation can indicate the identity of the first broadcaster and request that the second broadcaster join a co-stream. The invitation can also include the identity of the video game that will be played, the multi-player session, etc.

At 630, after acceptance by the second broadcaster, a co-stream is created. The co-stream can comprise independent broadcaster video game streams or a combined stream (e.g., a single composited video game stream).

At 640, the co-stream is streamed (e.g., via the Internet) to a plurality of viewer devices. The plurality of viewer devices provide the co-stream to viewers that are associated with the first and second broadcasters (e.g., viewers that were watching broadcast channels of the first and second broadcasters).

The example method 600 can be used to explicitly invite additional broadcasters. For example, a broadcaster associated with the co-stream can invite a number of additional broadcasters to join the co-stream.

Figure 7:
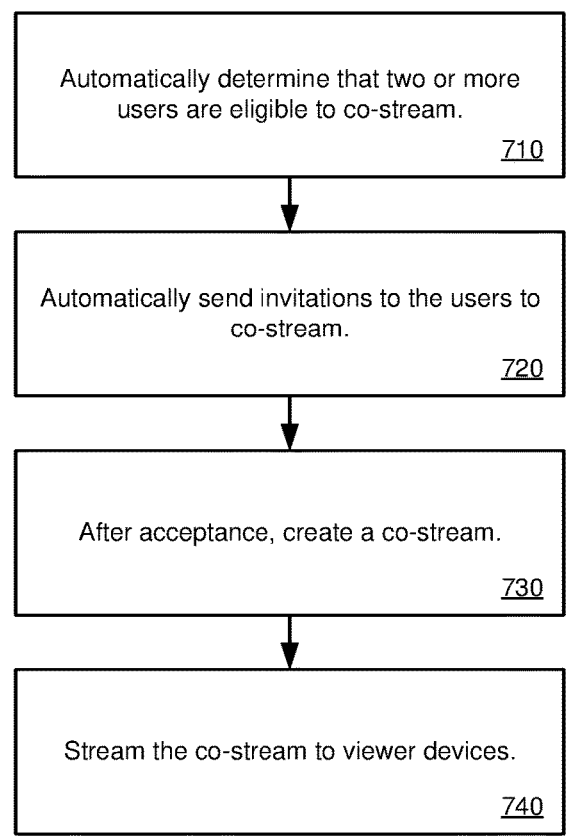
FIG. 7 is a flowchart of an example method for co-streaming within a live interactive video game streaming service.

FIG. 7 is a flowchart of an example method 700 for co-streaming within a live interactive video game streaming service. For example, the example method 700 can be performed by the live interactive video game streaming service 110.

At 710, an automatic determination is made that two or more users are eligible to co-stream. In some implementations, the users are currently playing a video game (e.g., the same video game). However, in some implementations, a user may be currently playing a video game and broadcasting a live interactive video game stream, playing a video game but not broadcasting, or not playing a video game.

At 720, invitations are automatically sent to the two or more users that were determined at 710. The invitations can be accepted or declined. For example, a user can receive a request (e.g., displayed as an alert or pop-up message on the user's computer display) and indicate whether the user accepts or declines the invitation. In some implementations, a user-configurable setting is used to automatically determine whether the user accepts or declines without the invitation being displayed to the user.

At 730, after acceptance by the two or more users (e.g., explicit acceptance or acceptance based on user-configurable settings), a co-stream is created. The co-stream can comprise independent broadcaster video game streams or a combined stream (e.g., a single composited video game stream).

At 740, the co-stream is streamed (e.g., via the Internet) to a plurality of viewer devices. The plurality of viewer devices provide the co-stream to viewers that are associated with the two or more users (e.g., viewers that were subscribed to broadcast channels of the two or more users).

Computing Systems

Figure 8:
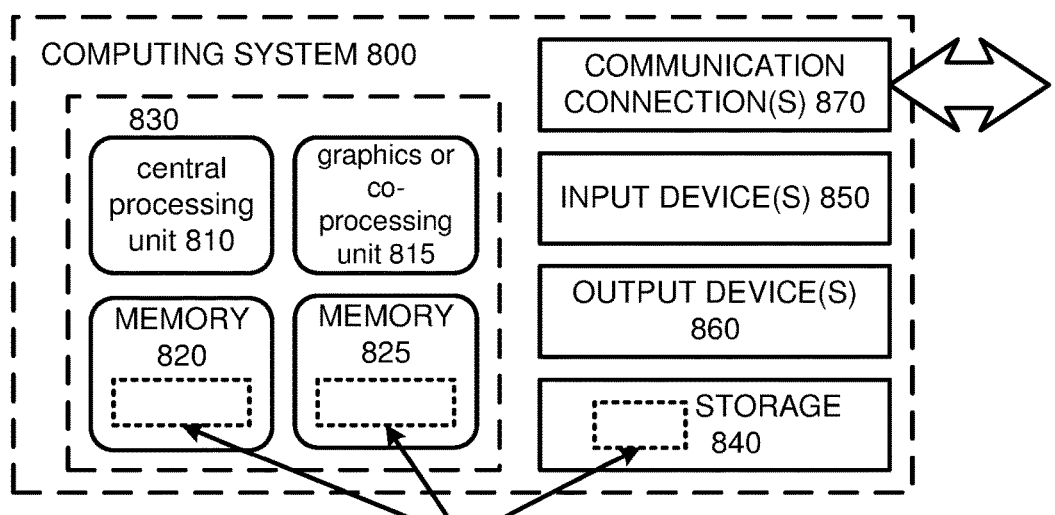
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
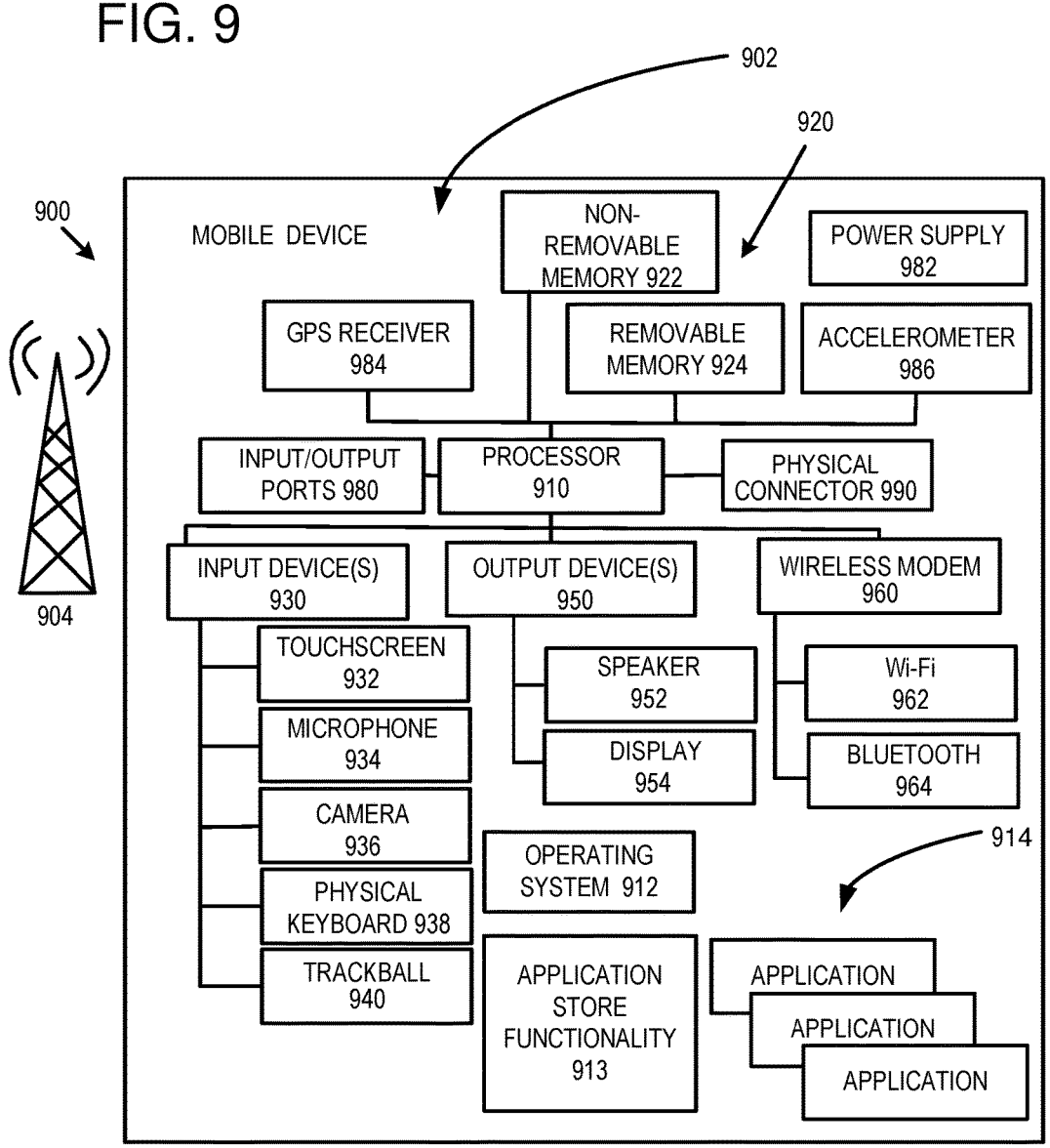
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections, such as 870, 960, 962, and 964.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit; and
   memory;
   the processing unit configured to execute computer instructions performing operations for co streaming within a live interactive video game streaming service, the operations comprising:
   automatically determining that two or more broadcasters are eligible to co-stream;
   automatically sending an invitation to the two or more broadcasters to co-stream their video game streams;
   based at least in part on acceptance by the two or more broadcasters, creating a co-stream comprising each of the two or more broadcasters' video game streams; and
   streaming the co-stream to a plurality of viewer devices, wherein the plurality of viewer devices provide the co-stream to viewers that were subscribed to, and currently watching, broadcast channels of the two or more broadcasters before the co-stream was created.

2. The computing device of claim 1, wherein automatically determining that the two or more broadcasters are eligible to co-stream comprises detecting that the two or more broadcasters are playing a same video game in a same multiplayer session.

3. The computing device of claim 1, wherein automatically determining that the two or more broadcasters are eligible to co-stream comprises determining that the two or more broadcasters are in a same party.

4. The computing device of claim 1, wherein automatically determining that the two or more broadcasters are eligible to co-stream comprises detecting that the two or more broadcasters are playing in a same video game tournament.

5. The computing device of claim 1, wherein each of the two or more broadcaster's video game streams are independently included in the co-stream, and wherein each of the two or more broadcaster's video game streams are individually saved by the live interactive video game streaming service and individually accessible by the plurality of viewer devices.

6. The computing device of claim 1, wherein each of the two or more broadcaster's video game streams are independently included in the co-stream, and wherein each of the two or more broadcaster's video game streams are independently resizable for display at the viewer devices.

7. The computing device of claim 1, wherein each of the two or more broadcaster's video game streams are independently included in the co-stream, and wherein bitrates with which the broadcaster's video game streams are streamed to the viewer devices are independently variable.

8. The computing device of claim 1, wherein the co-stream is created as a single composited video stream comprising the two or more broadcasters' video game streams.

9. The computing device of claim 1, the operations further comprising:
   detecting an in-game event;
   based at least in part on detecting the in-game event, automatically creating a virtual camera that presents a stream of the in-game event; and
   including the virtual camera stream in the co-stream.

10. The computing device of claim 1, the operations further comprising:
    generating combined chat information from the viewers of the first broadcaster and the viewers of the second broadcaster; and
    sending the combined chat information to the plurality of viewer devices.

11. The computing device of claim 10, wherein moderators associated with the first broadcaster before the co-stream was created and moderators associated with the second broadcaster before the co-stream was created are permitted to moderate viewers across both broadcasters of the co-stream while the co-stream is active.

12. The computing device of claim 1, wherein acceptance by the two or more broadcasters is controlled by user-configurable settings, and wherein the user-configurable settings indicate automatic acceptance of the invitation without broadcaster intervention.

13. A method, implemented by a computing device, for co-streaming within a live interactive video game streaming service, the method comprising:
    by the live interactive video game streaming service:
    receiving a request from a first broadcaster to invite a second broadcaster to join a co-stream;
    based at least in part on receiving the request, sending an invitation to the second broadcaster to join the co-stream with the first broadcaster;

based at least in part on acceptance by the second broadcaster, creating the co-stream of the first broadcaster's video game stream and the second broadcaster's video game stream; and streaming the co-stream to a plurality of viewer devices, wherein the plurality of viewer devices provide the co-stream to viewers that were subscribed to, and currently watching, broadcast channels of the first broadcaster and the second broadcaster before the co-stream was created.

14. The method of claim 13, further comprising:

generating combined chat information from the viewers of the first broadcaster and the viewers of the second broadcaster; and sending the combined chat information to the plurality of viewer devices.

15. The method of claim 13, wherein the co-stream supports combined interactive controls that are selectable by the viewers of the first and second broadcasters to interact with both the first broadcaster and the second broadcaster.

16. The method of claim 13, wherein each of the first and second broadcaster's video game streams are independently included in the co-stream, and wherein each of the first and second broadcaster's video game streams are individually saved by the live interactive video game streaming service and individually accessible by the plurality of viewer devices.

17. The method of claim 13, further comprising:

detecting an in-game event;

based at least in part on detecting the in-game event, automatically creating a virtual camera that presents a stream of the in-game event; and including the virtual camera stream in the co-stream.

18. A method, implemented by a computing device, for co-streaming within a live video streaming service, the method comprising:

automatically determining that two or more users are eligible to co-stream;

automatically sending an invitation to the two or more users to join a co-stream;

based at least in part on acceptance by the two or more users, creating a co-stream comprising a video game stream from each of the two or more users; and streaming the co-stream to a plurality of viewer devices, wherein the plurality of viewer devices provide the co-stream to viewers of the viewer devices that were subscribed to, and currently watching, broadcast channels of the two or more users before the co-stream was created.

19. The method of claim 18, wherein automatically determining that the two or more users are eligible to co-stream comprises detecting that the two or more users are playing a same video game in a same multiplayer session.

20. The method of claim 18, the method further comprising:

automatically sending an invitation to an additional user to join the co-stream as an audio-only stream; and based at least in part on acceptance by the additional user, adding the audio-only stream to the co-stream.

* * * * *